United States Patent
Hendry et al.

(10) Patent No.: US 11,338,641 B2
(45) Date of Patent: May 24, 2022

(54) SYSTEM FOR COOLING VEHICLE ELECTRONIC CONTROL UNIT WITH HVAC

(71) Applicant: DENSO International America, Inc., Southfield, MI (US)

(72) Inventors: Jason Hendry, Milford, MI (US); James Link, West Bloomfield, MI (US); Sanjay Singh, Belleville, MI (US)

(73) Assignee: DENSO International America, Inc., Southfield, MI (US)

( * ) Notice: Subject to any disclaimer, the term of this patent is extended or adjusted under 35 U.S.C. 154(b) by 112 days.

(21) Appl. No.: 16/835,362

(22) Filed: Mar. 31, 2020

(65) Prior Publication Data
US 2021/0237532 A1  Aug. 5, 2021

Related U.S. Application Data

(60) Provisional application No. 62/968,541, filed on Jan. 31, 2020.

(51) Int. Cl.
*B60H 1/00* (2006.01)

(52) U.S. Cl.
CPC ..... *B60H 1/00278* (2013.01); *B60H 1/00564* (2013.01); *B60H 1/00735* (2013.01); *B60H 1/00871* (2013.01); *B60H 1/00985* (2013.01)

(58) Field of Classification Search
CPC ............ B60H 1/00271; B60H 1/00285; B60H 1/00564; B60H 1/00735; B60H 1/00871; B60H 1/00985

USPC ........................................................ 62/259.2
See application file for complete search history.

(56) References Cited

U.S. PATENT DOCUMENTS

| | | | |
|---|---|---|---|
| 5,669,813 A * | 9/1997 | Jairazbhoy | B60H 1/00271 361/645 |
| 7,997,966 B2 * | 8/2011 | Yoda | B60L 3/0046 454/339 |
| 9,914,336 B2 * | 3/2018 | Smith | B60L 50/66 |
| 10,603,978 B2 * | 3/2020 | Sawyer | B60H 1/00564 |
| 10,618,381 B2 * | 4/2020 | Kim | B60H 1/00899 |
| 10,981,431 B2 * | 4/2021 | Eriksson | B60H 1/00564 |
| 2006/0080986 A1 * | 4/2006 | Inoue | B60H 1/00057 62/259.2 |
| 2007/0137235 A1 * | 6/2007 | Heck | B60H 1/00271 62/259.2 |
| 2019/0105968 A1 | 4/2019 | Rice | |
| 2021/0185862 A1 * | 6/2021 | Nagao | H05K 7/20863 |

FOREIGN PATENT DOCUMENTS

JP    2012101689 A    5/2012

* cited by examiner

*Primary Examiner* — Marc E Norman
(74) *Attorney, Agent, or Firm* — Harness, Dickey & Pierce, P.L.C.

(57) ABSTRACT

A system for cooling a heat generating component of a vehicle. The system includes a blower of a vehicle heating, ventilation, and air conditioning (HVAC) system. An air duct extends from the blower to the heat generating component to cool the heat generating component.

15 Claims, 6 Drawing Sheets

SYSTEM FOR COOLING VEHICLE ELECTRONIC CONTROL UNIT WITH HVAC

CROSS-REFERENCE TO RELATED APPLICATION

This application claims the benefit of U.S. Provisional Application No. 62/968,541 filed on Jan. 31, 2020, the entire disclosure of which is incorporated herein by reference.

FIELD

The present disclosure relates to a system for cooling a vehicle electronic control unit with a heating, ventilation, and air conditioning (HVAC) system of the vehicle.

BACKGROUND

This section provides background information related to the present disclosure, which is not necessarily prior art.

Modern vehicles typically include numerous computers, generically referred to as control modules or electronic control units (ECU's). An example of an ECU is a cockpit domain controller, also known as a head unit. The head unit is often mounted at the vehicle instrument panel, under a rear seat, in a trunk, etc.

The head unit performs numerous different computing functions. For example, typical head units perform processing for navigation, telephony, speech recognition, AI functions, Internet applications, rear and surround cameras, hands free calling, etc. The head unit may also drive vehicle display screens (as many as 10 or more) including the instrument cluster, heads-up-display (HUD), rear seat entertainment, WiFi, Ethernet (such as 11-port gigabit Ethernet), and so on. These functions require very high computing power and have very high memory requirements. Thus, cutting edge electronic components and microprocessors are used (e.g., systems-on-chip). Such electronics are typically not hardened to operate in temperatures above 75° C. to 85° C. ambient.

Head units also tend to generate a great amount of heat during operation, similar to super computer server farms that require liquid cooling and refrigeration. If a head unit is confined to an enclosed space, the heat generated by the head unit may result in temperatures in the enclosed space rising to more than 85° C., which may cause a "latch up condition" in transistors of the head unit's microprocessor. For head units to function optimally, they must be kept cool. The present disclosure is directed to systems for cooling a vehicle head unit with a heating, ventilation, and air conditioning (HVAC) system of the vehicle.

SUMMARY

This section provides a general summary of the disclosure, and is not a comprehensive disclosure of its full scope or all of its features.

The present disclosure provides for a system for cooling a heat generating component of a vehicle. The system includes a blower of a heating, ventilation, and air conditioning (HVAC) system. An air duct extends from the blower to the heat generating component to cool the heat generating component.

The present disclosure further provides for a system for cooling a heat generating component of a vehicle. The system includes a blower of a heating, ventilation, and air conditioning (HVAC) system. An air duct extends from the blower to the heat generating component to cool the heat generating component. An HVAC control unit is configured to monitor load of the heat generating component and identify when the load exceeds a predetermined threshold. When the load exceeds the predetermined threshold, the HVAC control unit is configured to direct all airflow generated by the blower through the air duct and to the heat generating component to cool the heat generating component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
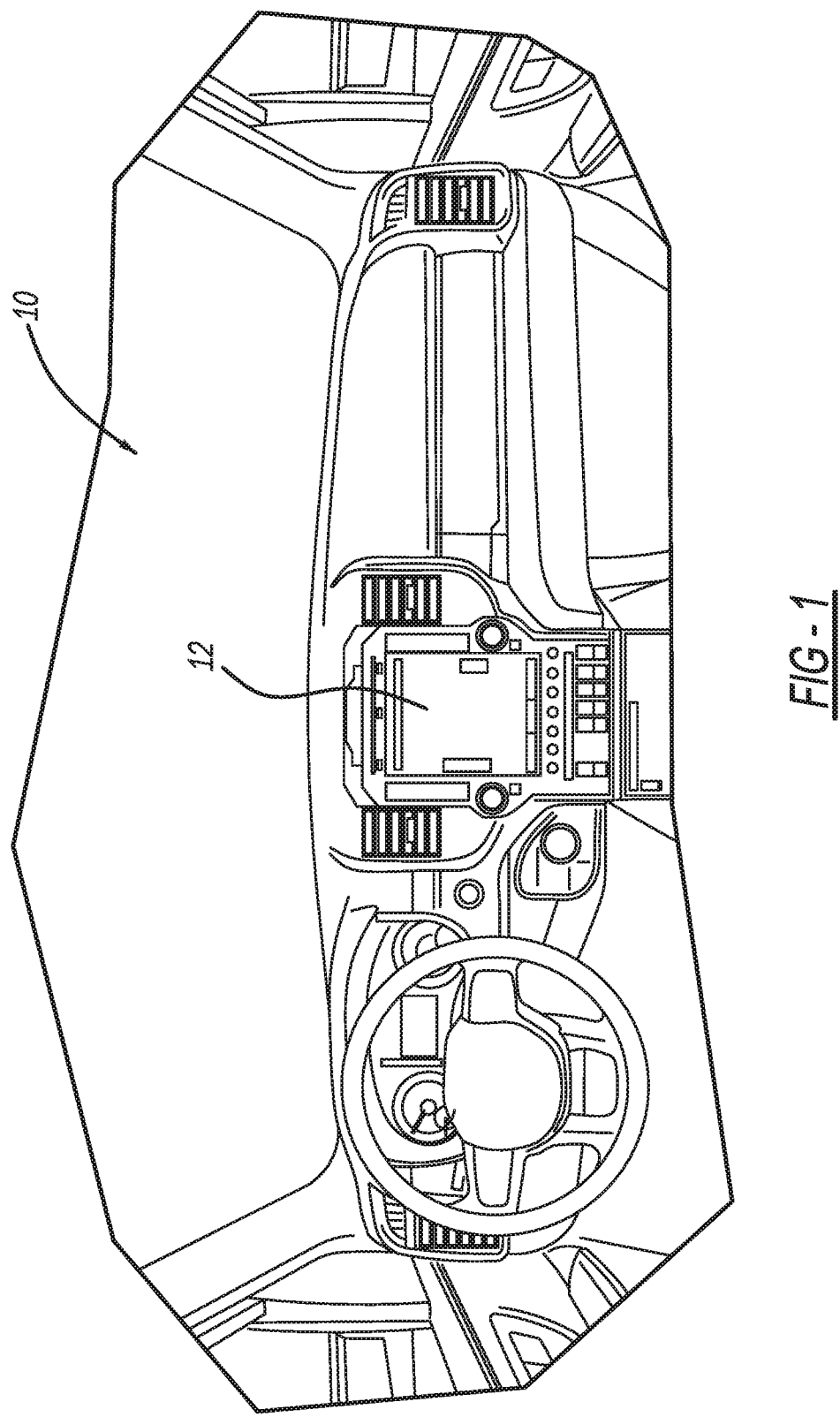
FIG. 1 illustrates an exemplary vehicle cockpit including a display screen.
Figure 2:
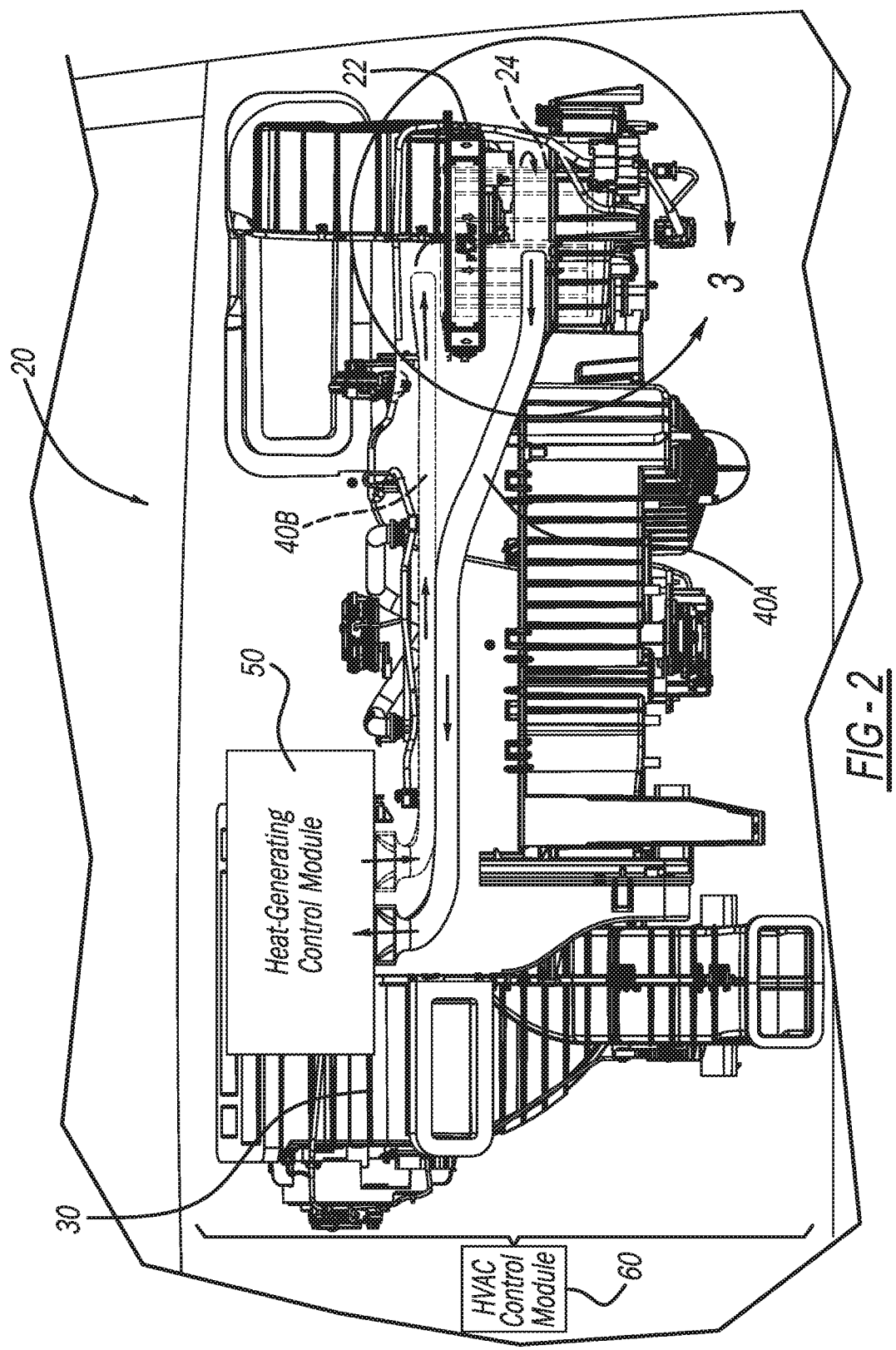
FIG. 2 illustrates an exemplary heat generating control module, and an HVAC system configured to cool the control module in accordance with the present disclosure.
Figure 3:
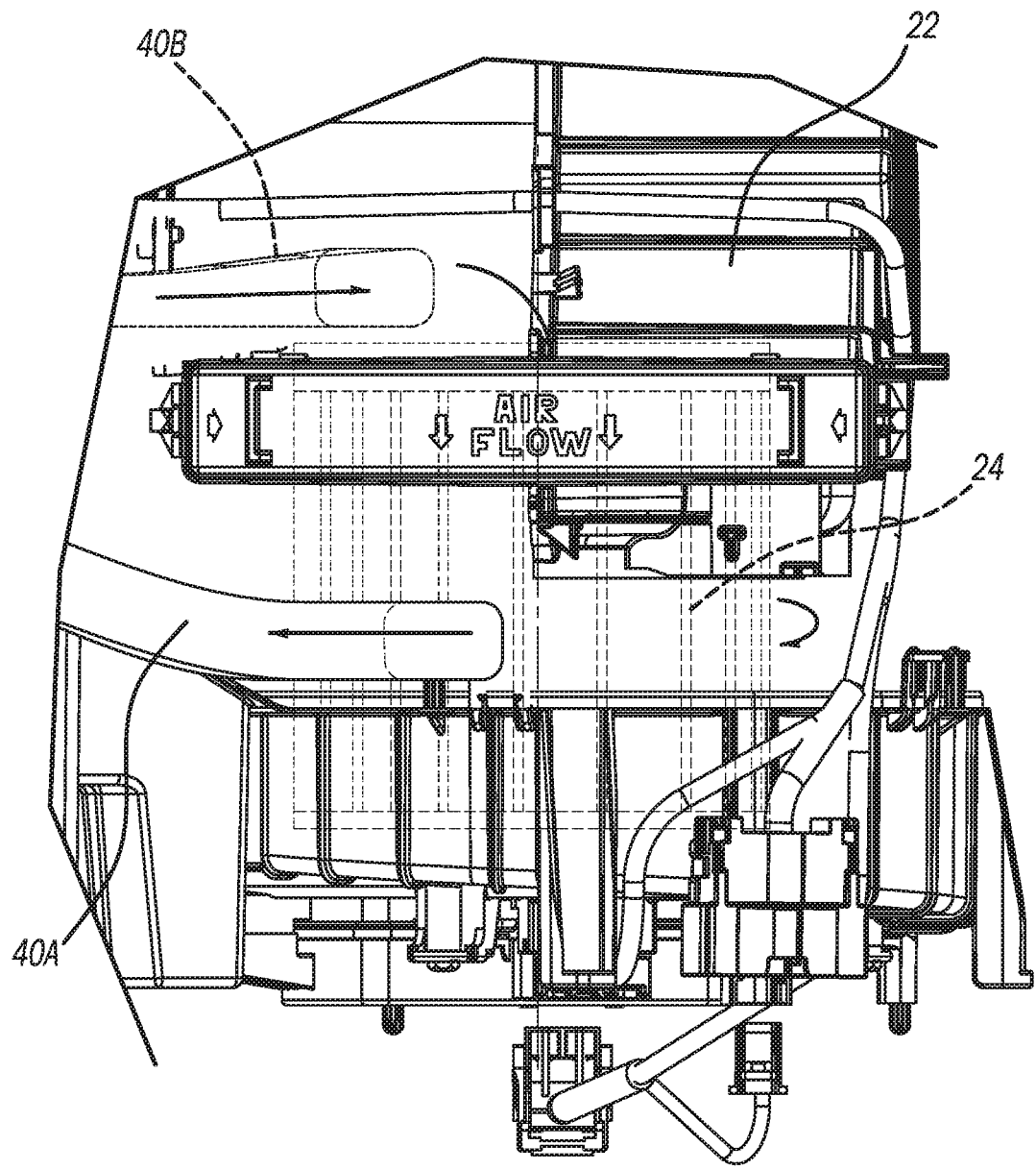
FIG. 3 illustrates area 3 of FIG. 2.
Figure 4:
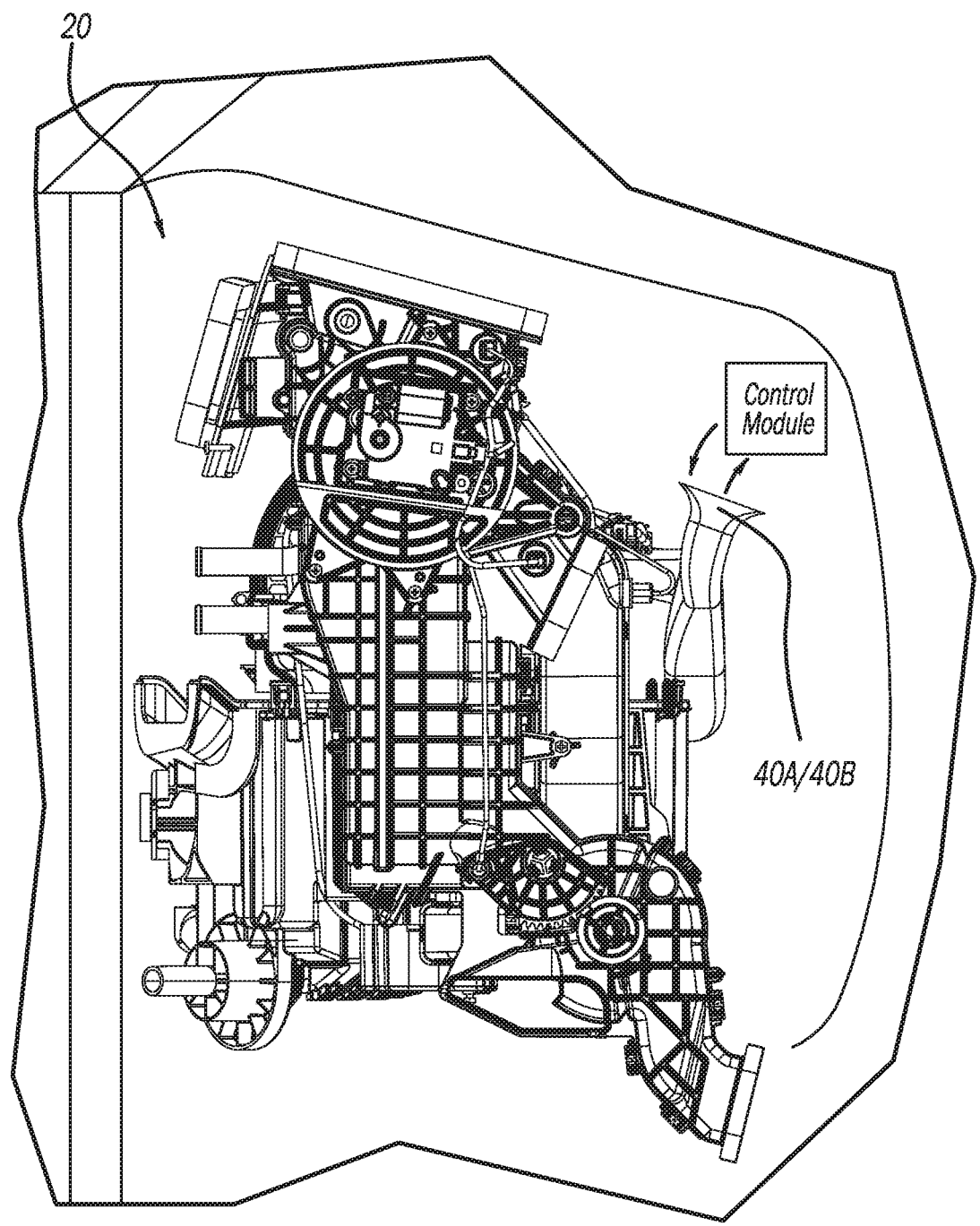
FIG. 4 is a side view of the HVAC system of FIG. 2.

FIG. 1 illustrates a cockpit area of an exemplary vehicle passenger cabin 10. FIGS. 2-4 illustrate an exemplary heating, cooling, and air conditioning (HVAC) system 20 in accordance with the present disclosure. Although the HVAC system 20 is described as a vehicle HVAC system, the HVAC system 20 may be any suitable HVAC system configured to heat and/or cool any suitable area. With respect to vehicles, the HVAC system 20 may be configured to heat and/or cool a cabin of any suitable vehicle, such as a passenger vehicle, mass transit vehicle, utility vehicle, military vehicle/equipment, construction vehicle/equipment, watercraft, aircraft, etc.

The HVAC system 20 generally includes a blower 22 including any suitable airflow generating element, such as a blower wheel 24. The blower 22 is connected to an HVAC case 30, which includes any suitable airflow heating element and/or cooling element. The blower 22 generates airflow through the HVAC case 30, which is cooled or heated in the HVAC case 30. The heated or cooled airflow then passes to the passenger cabin.

The HVAC system 20 includes one or both of a first air duct 40A and a second air duct 40B extending from the blower 22. The first air duct 40A and the second air duct 40B may be any suitable air ducts, such as shower ducts. The first air duct 40A extends from the blower 22 on an outlet side of the blower wheel 24, such as along the side of the blower wheel 24 so that airflow generated by the blower wheel 24 flows into and through the first air duct 40A. The second air duct 40B extends from the blower 22 on an inlet side of the blower wheel 24, such as upstream of the blower wheel 24 so that the blower wheel 24 draws air through the second air duct 40B, into the blower wheel 24, and through the blower wheel 24. The HVAC system 20 may include only the first air duct 40A, only the second air duct 40B, or both the first air duct 40A and the second air duct 40B.

The first and second air ducts 40A and 40B extend from the blower 22 to any suitable heat generating component to cool the heat generating component. In the example, of FIG. 2, the heat generating component is any suitable heat generating control module 50. In this application, including the definitions below, the term "control module" or the term "controller" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 50 may be configured to control at least one of the following: a display screen 12 (FIG. 1); an infotainment system; a navigation system; autonomous driving; a heads-up display; a collision avoidance system; and/or a communication system. The control module 50 may be any suitable control module, such as a head unit (including a DDC head unit, for example), cockpit domain controller, etc. The head unit may be configured to perform numerous different computing functions. For example, typical head units perform processing for navigation, telephony, speech recognition, AI functions, Internet applications, rear and surround cameras, hands free calling, etc. The head unit may also drive vehicle display screens (as many as ten or more displays) including an instrument cluster, heads-up-display (HUD), rear seat entertainment, WiFi, Ethernet (such as 11-port gigabit Ethernet), and so on.

Figure 5:
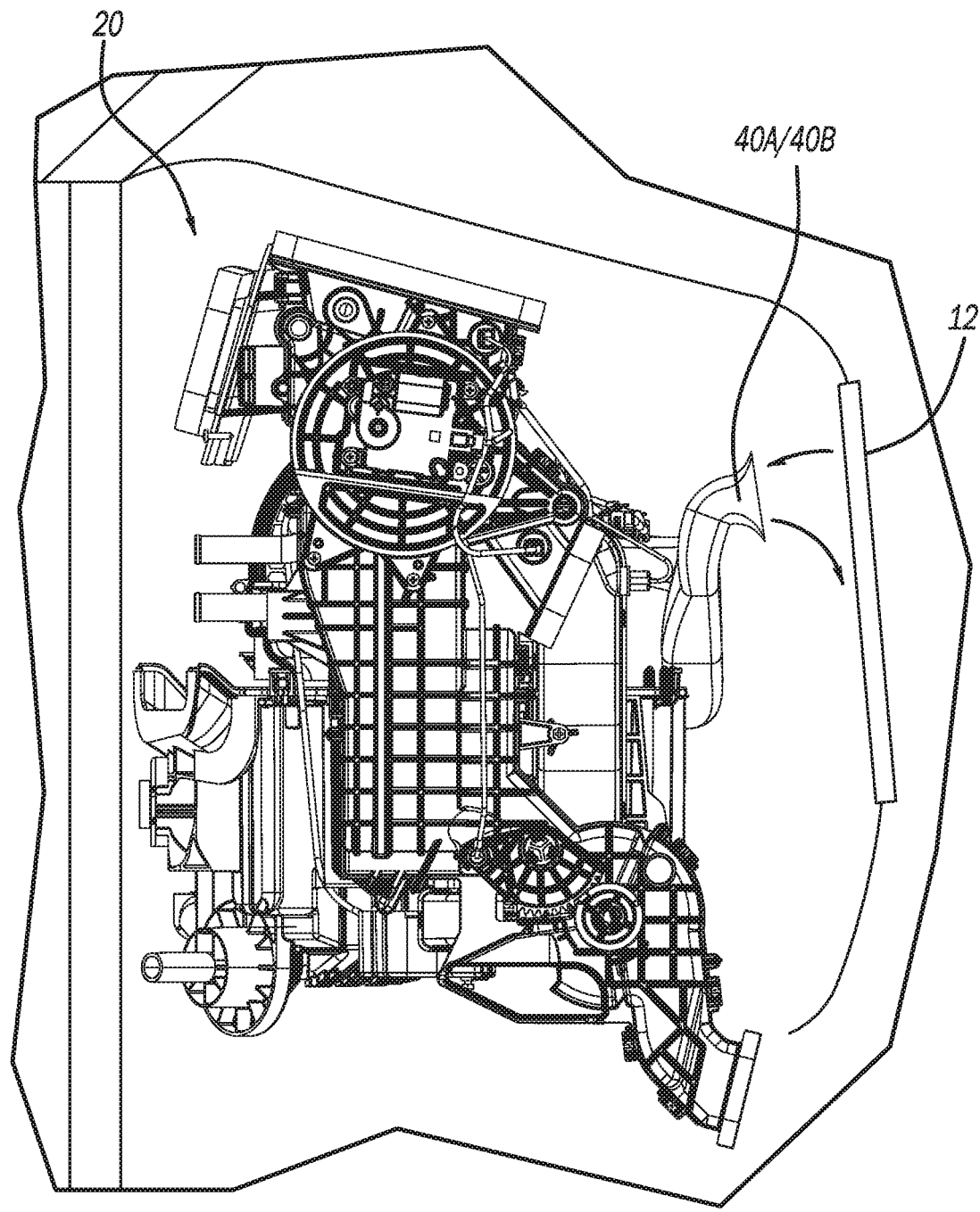
FIG. 5 is a side view of the HVAC system of FIG. 2 cooling the display of FIG. 1.
Figure 6:
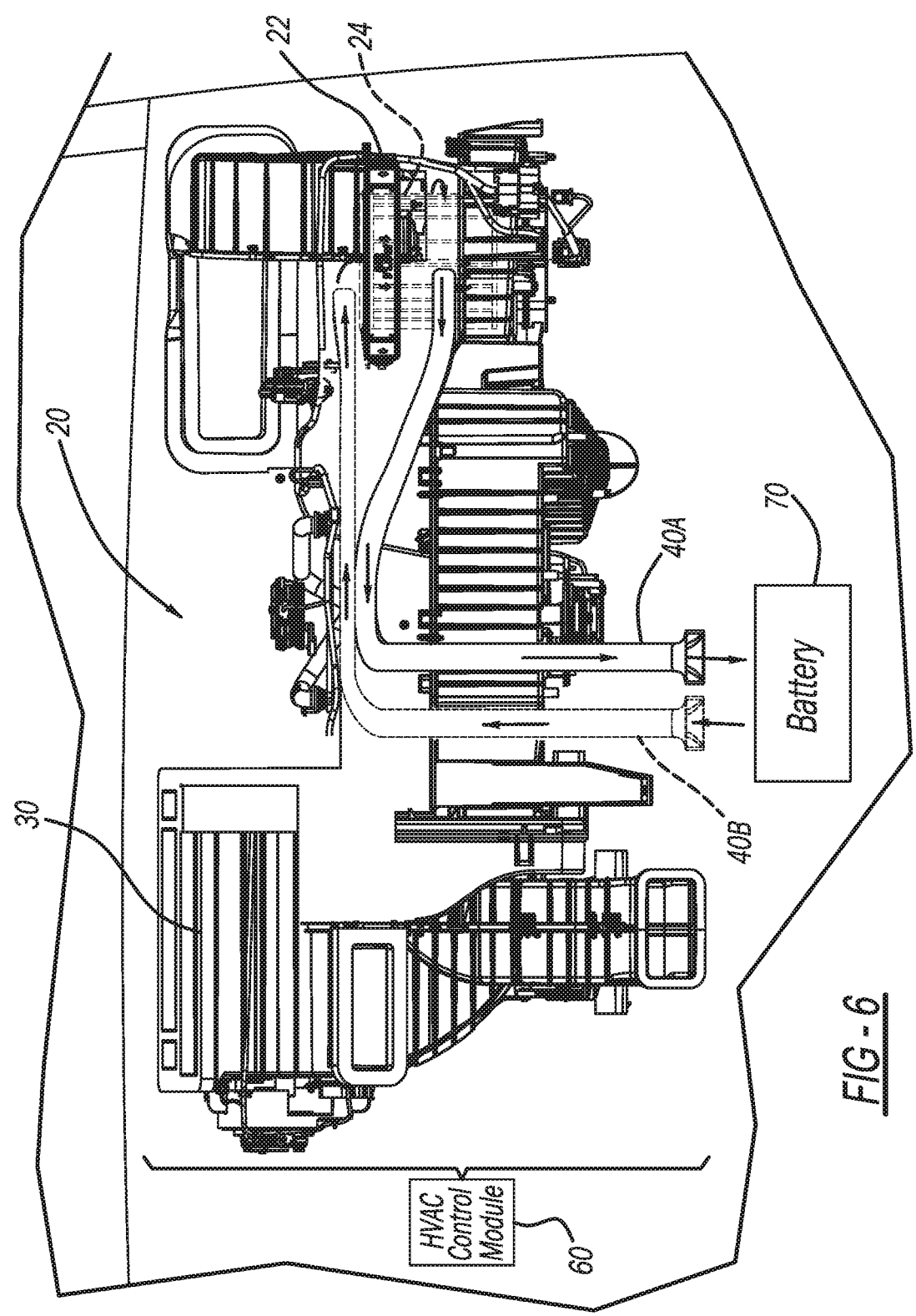
FIG. 6 illustrates the HVAC system of FIG. 2 configured to cool a battery.

In the example of FIG. 5, the heat generating component is the display screen 12. The display screen 12 may be a center stack display as illustrated, or any other display in need of cooling, such as any dashboard display or any infotainment display. In the example of FIG. 6, the heat generating component is a battery 70. The battery 70 may be any vehicle battery, or any other battery in need of cooling. For example, the battery 70 may be configured to power a motor for propelling the vehicle, such as used in a fully electric vehicle or hybrid vehicle.

The HVAC system 20 further includes an HVAC control module 60. The HVAC control module 60 is configured to control the blower 22 (such as activation, deactivation, and blower speed), heating and cooling functionality of the HVAC case 30, airflow distribution to the passenger cabin 10, and airflow through one or both of the air ducts 40A and 40B. The HVAC control module 60 is further configured to monitor load of the heat generating component, such as the display 12, the control module 50, and/or the battery 70, and identify when the load exceeds a predetermined threshold.

Under normal driving conditions and normal loads of the heat generating component, airflow passes to or from the heat generating component to advantageously cool the heat generating component. In applications in which the air duct 40A is connected to the outlet side of the blower 22, airflow generated by the blower wheel 24 flows through the air duct 40A to the heat generating component to cool the heat generating component. In applications in which the air duct 40B is connected to the inlet side of the blower 22, the blower wheel 24 draws hot air away from the heat generating component into the blower 22 to cool the heat generating component. In applications in which both the air duct 40A and the air duct 40B are included, the blower wheel 24 blows airflow through the air duct 40A and across the heat generating component to cool the heat generating component. After passing across the heat generating component, the airflow is drawn by the blower wheel 24 back through the air duct 40B to the blower 22 in order to circulate airflow across the heat generating component.

The HVAC control module 60 is configured to control the HVAC system 20 to vary the amount of airflow into and out of the air ducts 40A and/or 40B based on ambient temperature. For example, the HVAC control module 60 is configured to direct less airflow to the heat generating component from the blower 22 through the duct 40A, or draw less airflow from the heat generating component to the blower 22 through the duct 40B, when the ambient temperature is below 40° C. then when the ambient temperature is greater than 40° C.

The HVAC control module 60 is further configured restrict airflow of the HVAC system 20 to only the air duct 40A and/or the air duct 40B when the load of the heat generating component exceeds a predetermined value and/or when the temperature of the heat generating unit exceeds a predetermined temperature. Load and temperature sensors may be included with the heat generating component and connected to the HVAC control module 60. For example, when the load and/or temperature exceeds a predetermined threshold, the HVAC control module 60 is configured to activate the blower, close all passenger cabin air ducts, and direct all airflow generated by the blower 22 to the heat generating component. The HVAC control module 60 is configured to set the blower 22 to any suitable blower speed, such as a low speed when the HVAC system 20 is otherwise off.

The present disclosure thus advantageously provides for a system for cooling the heat generating component of the vehicle using the vehicle's HVAC system 20. As a result, no additional cooling system for the heat generating component is necessary, which advantageously reduces costs, weight, assembly time, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for cooling a heat generating component of a vehicle, the system comprising:
   a blower of a vehicle heating, ventilation, and air conditioning (HVAC) system;
   an air duct extending from the blower to the heat generating component to cool the heat generating component; and
   an HVAC control unit configured to monitor load of the heat generating component and identify when the load exceeds a predetermined threshold, when the load exceeds the predetermined threshold the HVAC control unit is configured to run the blower, close all passenger cabin air ducts, and direct all airflow generated by the blower to the heat generating component.

2. The system of claim 1, wherein the heat generating component is a control module.

3. The system of claim 2, wherein the control module is configured to control at least one of the following: a display screen; an infotainment system; a navigation system; autonomous driving; a heads-up display; a collision avoidance system; and a communication system.

4. The system of claim 1, wherein the heat generating component is a battery.

5. The system of claim 1, wherein the heat generating component is a display.

6. The system of claim 1, wherein the heat generating component is a head unit.

7. The system of claim 1, wherein the air duct extends from an outlet area of the blower downstream of an airflow generating element of the blower such that the airflow generating element pushes airflow through the air duct to cool the heat generating component.

8. The system of claim 1, wherein the air duct extends from an inlet area of the blower upstream of an airflow generating element of the blower such that the airflow generating element pulls air from an area about the heat generating component through the air duct to cool the heat generating component.

9. The system of claim 1, wherein the HVAC control unit is further configured to direct airflow from the blower to the heat generating component through the air duct when the vehicle HVAC system is on and ambient temperature is greater than 40° C.

10. The system of claim 1, wherein the HVAC control unit is further configured to direct less airflow from the blower to the heat generating component through the air duct when the ambient temperature is below 40° C. then when the ambient temperature is greater than 40° C.

11. A system for cooling a heat generating component of a vehicle, the system comprising:
    a blower of a heating, ventilation, and air conditioning (HVAC) system;
    an air duct extending from the blower to the heat generating component to cool the heat generating component; and
    an HVAC control unit configured to monitor load of the heat generating component and identify when the load exceeds a predetermined threshold, when the load exceeds the predetermined threshold the HVAC control unit is configured to direct all airflow generated by the blower through the air duct and to the heat generating component to cool the heat generating component.

12. The system of claim 11, wherein the heat generating component is a head unit.

13. The system of claim 11, wherein the air duct is a first air duct, the system further including a second air duct extending from an inlet area of the blower upstream of an airflow generating element of the blower such that the airflow generating element pulls air from the heat generating component through the air duct to cool the heat generating component.

14. The system of claim 11, wherein the heat generating component is a control module configured to control at least one of the following: a display screen; an infotainment system; a navigation system; autonomous driving; a heads-up display; a collision avoidance system; and a communication system.

15. The system of claim 11, wherein the heat generating component is a battery.

\* \* \* \* \*